(12) United States Patent
Loewen et al.

(10) Patent No.: US 10,755,825 B2
(45) Date of Patent: Aug. 25, 2020

(54) PASSIVE ELECTRICAL COMPONENT FOR SAFETY SYSTEM SHUTDOWN USING FARADAY'S LAW

(71) Applicant: GE-Hitachi Nuclear Energy Americas LLC, Wilmington, NC (US)

(72) Inventors: Eric P. Loewen, Wilmington, NC (US); David W. Webber, Wilmington, NC (US); Seth Ryan Paul Strege, Wilmington, NC (US); Maria E. Pfeffer, Wilmington, NC (US); Scott L. Pfeffer, Wilmington, NC (US)

(73) Assignee: GE-HITACHI NUCLEAR ENERGY AMERICAS LLC, Wilmington, DE (US)

(*) Notice: Subject to any disclaimer, the term of this patent is extended or adjusted under 35 U.S.C. 154(b) by 65 days.

(21) Appl. No.: 16/176,716

(22) Filed: Oct. 31, 2018

(65) Prior Publication Data
US 2020/0135353 A1    Apr. 30, 2020

(51) Int. Cl.
| | | |
|---|---|---|
| *G21D 3/04* | (2006.01) | |
| *G21C 7/36* | (2006.01) | |
| *G21C 9/012* | (2006.01) | |
| *G21C 9/02* | (2006.01) | |

(52) U.S. Cl.
CPC ............ *G21D 3/04* (2013.01); *G21C 7/36* (2013.01); *G21C 9/012* (2013.01); *G21C 9/02* (2013.01)

(58) Field of Classification Search
CPC . G21D 3/04; G21C 7/36; G21C 9/012; G21C 9/02
USPC ........................................................ 324/660
See application file for complete search history.

(56) References Cited

U.S. PATENT DOCUMENTS

| | | | |
|---|---|---|---|
| 3,115,450 A | | 12/1963 | Schanz |
| 3,660,231 A | | 5/1972 | Fox et al. |
| 4,320,433 A | * | 3/1982 | Yamaki ................ H02H 3/332 |
| | | | 324/117 R |
| 4,949,362 A | | 8/1990 | Gaubatz |
| 4,957,690 A | | 9/1990 | Fennem |
| 5,978,191 A | * | 11/1999 | Bonniau ................ H02H 3/335 |
| | | | 361/45 |

(Continued)

FOREIGN PATENT DOCUMENTS

EP    0781451 A1    7/1997

OTHER PUBLICATIONS

International Search Report and Written Opinion dated Jan. 30, 2020 (corresponding to PCT/US2019/058513).

(Continued)

*Primary Examiner* — Reena Aurora
(74) *Attorney, Agent, or Firm* — Harness, Dickey & Pierce, P.L.C.

(57) ABSTRACT

An electro-technical device includes a first coil connected to a first sensor for receiving a current therefrom representative of a sensed condition, the first coil being anchored at first and second ends. A second coil is connected to a second sensor for receiving a current therefrom representative of a sensed condition, the second coil being anchored at first and second ends and being adjacent to the first coil. When the first and second coils receive an increased current from the first and second sensors, the first and second coils each create a magnetic flux that repel one another in order to cause at least one of the coils to break so that a shutdown signal can be sent.

13 Claims, 3 Drawing Sheets

(56) References Cited

U.S. PATENT DOCUMENTS 7,614,233 B2 11/2009 Chaki et al.
8,749,329 B2 * 6/2014 Fasano ............... H01H 71/2409
  335/172

OTHER PUBLICATIONS

"DCIS Integration Tests for Lungmen Nuclear Power Plant"; Jiin-Ming Lin and Jeen-Yee Lee; Department of Nuclear Engineering, Taiwan Power Compoany; NPIC&HMIT 2017; Jun. 11-15, 2017; pp. 1962-1971.

* cited by examiner

PASSIVE ELECTRICAL COMPONENT FOR SAFETY SYSTEM SHUTDOWN USING FARADAY'S LAW

BACKGROUND

Field

The present disclosure relates to a safety system shutdown including a passive electrical component that senses a system parameter and becomes tripped if a predetermined set point is reached so that a signal is sent to take an action in the system. The passive electrical component makes use of the principles of Faraday's Law.

Description of Related Art

This section provides background information related to the present disclosure which is not necessarily prior art.

Modern nuclear reactors use a variety of digital systems for both control and safety, referred to as a Distributed Control and Information System (DCIS). These systems must be redundant, diverse, fault tolerant, and have extensive self-diagnosis while the system is in operation. Meanwhile, the nuclear digital industry is concerned with common cause software failure. Even more damaging is a cyberattack to, or through, the system safety systems. In the digital industry, the desire to increase computational power while decreasing component size results in a very small digital device with embedded software. It is very difficult to convince a regulatory body that these systems cannot have a common cause failure. Even more damaging operations can occur when this compact digital system is subjected to a cyberattack. These extreme unknown conditions of a nuclear power plant safety system lead to the cause for redundancy, independence, and determinacy, all of which contribute to significant added cost.

FIG. 5 schematically shows a conventional distributed control and information system (DCIS) 200 with both a safety portion 202 and non-safety portion 204 that are interfaced by a control panel 203. The present disclosure is directed to the safety portion 202 of the DCIS 200 which is shown in FIG. 6. The safety portion 202 of the DCIS 200 includes four independently designed divisions 202A-202D which each receive measured system signals that are collected and sent from a remote multiplexer unit RMU 205 which provides output to the digital trip module DTM 206 which each provide outputs to the trip logic units TLU 208 which each provide an output signal to the output logic unit OLU 210. The conventional safety portions 202 use a voting logic of at least two out of four of the different divisions 202A-202D receiving like signals in order to determine a fault (i.e., pressures and temperatures are not compared against each other). It becomes more difficult for the nuclear power plant control system designer, purchaser, installer, and operator to establish and trace the essential safety signals to ensure the system is performing as designed. A device and method is needed on a scale that humans can vary "signal flow" or "trace the flow of electrons/data so that the system is immune from cyber-attack.

SUMMARY

This section provides a general summary of the disclosure, and is not a comprehensive disclosure of its full scope or all of its features.

The present disclosure provides electro-technical devices that, coupled to control systems, can provide passive system safety shutdown using Faraday's Law. These devices will solve the issue of common cause software failure or cyber security attacks that are inherent limitations of digital safety systems. The Faraday's Law contactor provides an electro-technical device that can be set up in multiple configurations to protect a nuclear power plant, or another sensitive infrastructure. The Faraday's Law contactor can be produced using metallic and plastic 3-D printing machines that can be utilized to ensure consistent manufacture of the electrotechnical device for which the manufacturing data can be captured and stored for utilization in confirming the device's consistent operational characteristics. The devices use a simple pass/fail or go/no-go check to convey to an electrical safety system to change state to safe shutdown. The printed device is placed into the safety system to perform three basic tasks: sense a system parameter (e.g. temperature, flow, pressure, power or rate of change), if the predetermined set point is reached—result in a "tripped" state, and lastly, if the safety system logic is met—send a signal to take an action in the system, such as shutdown. In the event of normal power supply loss, the Faraday's Law contactor can either fail as is or fail in a safe state, depending on user requirements. The system prevents any loss of the safety function of the digital device due to power outage. The device also eliminates failures due to software or digital cyber-attacks.

An electro-technical device includes a first coil connected to a first sensor for receiving a current therefrom representative of a sensed condition, the first coil being anchored at first and second ends. A second coil is connected to a second sensor for receiving a current therefrom representative of a sensed condition, the second coil being anchored at first and second ends and being adjacent to the first coil, wherein when the first and second coils receive an increased current from the first and second sensors, the first and second coils each create a magnetic flux that repel one another in order to cause at least one of the coils to break.

An electro-technical device includes a first coil connected to a first sensor for receiving a current therefrom representative a sensed condition, the first coil being anchored at first and second ends. A second coil is connected to a second sensor for receiving a current therefrom representative of a sensed condition, the second coil being anchored at first and second ends and being adjacent to the first coil. A third coil connected to a third sensor for receiving a current therefrom representative of a sensed condition, the third coil being anchored at first and second ends and being adjacent to the first and second coils. A fourth coil connected to a fourth sensor for receiving a current therefrom representative of a sensed condition, the fourth coil being anchored at first and second ends and being adjacent to the first, second and third coils. When at least two of the first, second, third and fourth coils receive an increased current from at two of the first, second, third and fourth sensors, the at least two of the first, second, third and fourth coils each create a magnetic flux that repel one another in order to cause at least one of the coils to break so that a shutdown signal is transmitted.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
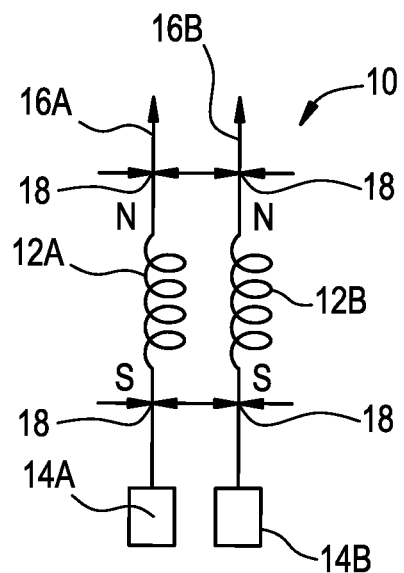
FIG. 1 is a schematic view of a Faraday's Law Contactor according to the principles of the present disclosure.
Figure 2:
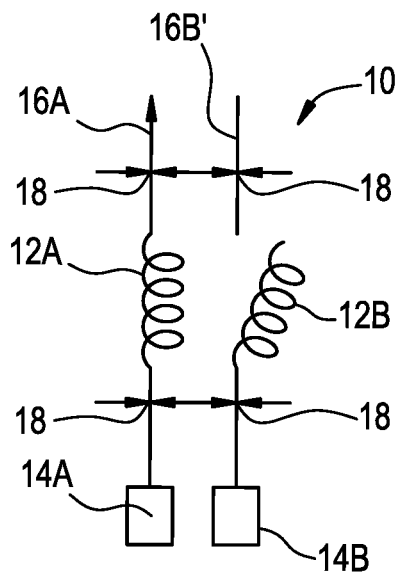
FIG. 2 is a schematic view of the Faraday's Law Contactor of FIG. 1 shown in a tripped state.

FIGS. 1 and 2 provide an illustration of a Faraday's law contactor 10 including a pair of helical coils 12A, 12B arranged side by side and each connected to a pair of separate sensors 14A, 14B and provide signals to the wires 16A, 16B, respectively. The sensors 14A, 14B can each sense one of a temperature, a pressure, a flow or other desired parameter. When the sensor detects an increase in the parameter being sensed, the sensor provides an increased current flow through the coils 12A, 12B. The increased current flow creates a magnetic flux in each coil 12A, 12B. Because each coil 12A, 12B is wound in a same direction, and a current flow is in a same direction, each coil has a similarly oriented North and South pole. The opposite ends of the coils 12A, 12B are physically restrained at points 18 so that, as the common poles of the coils 12A, 12B repel one another, so that the repelling force causes one or both of the coils 12A, 12B to break and disrupts the signal through the wire 16B', as shown in FIG. 2.

The coils 12A, 12B can be made using a 3-D digital printing method and can be made from a brittle metallic material in order to have a breaking point that can be achieved by the repelling force of the magnetized coils. The 3-D printing machines can be utilized to ensure consistent manufacture of the electrotechnical device for which the manufacturing data can be captured and stored for utilization in confirming the device's consistent operational characteristics. An example material can include an iron-silicon alloy (Fe—Si). This type of alloy is a soft ferromagnetic material that can easily be magnetized and demagnetized. The coils 12A, 12B can be optionally designed and made with breaking points specifically designed to break when subjected to magnetic repelling forces associated with a current level indicative of the sensor exceeding a predetermined set point temperature, pressure, flow or other parameter. When one or both of the coils 12A, 12b breaks, a current through the coil is interrupted. The interrupted current can be used to signal a system emergency condition for shutting down the system.

Figure 3:
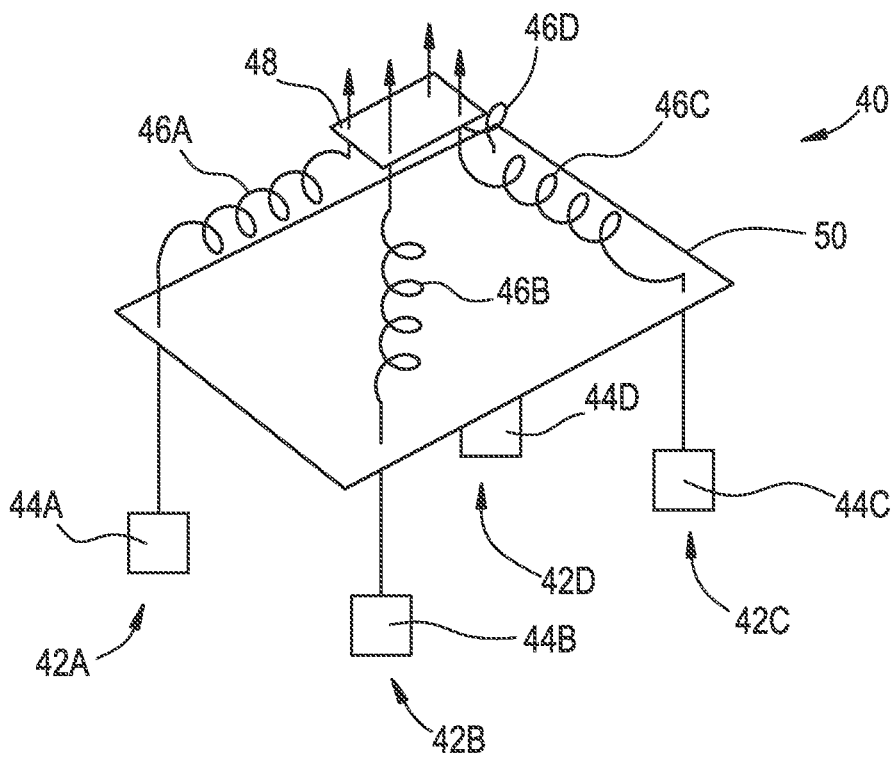
FIG. 3 is a schematic perspective view of a Faraday's Law Contactor for a nuclear system.
Figure 4:
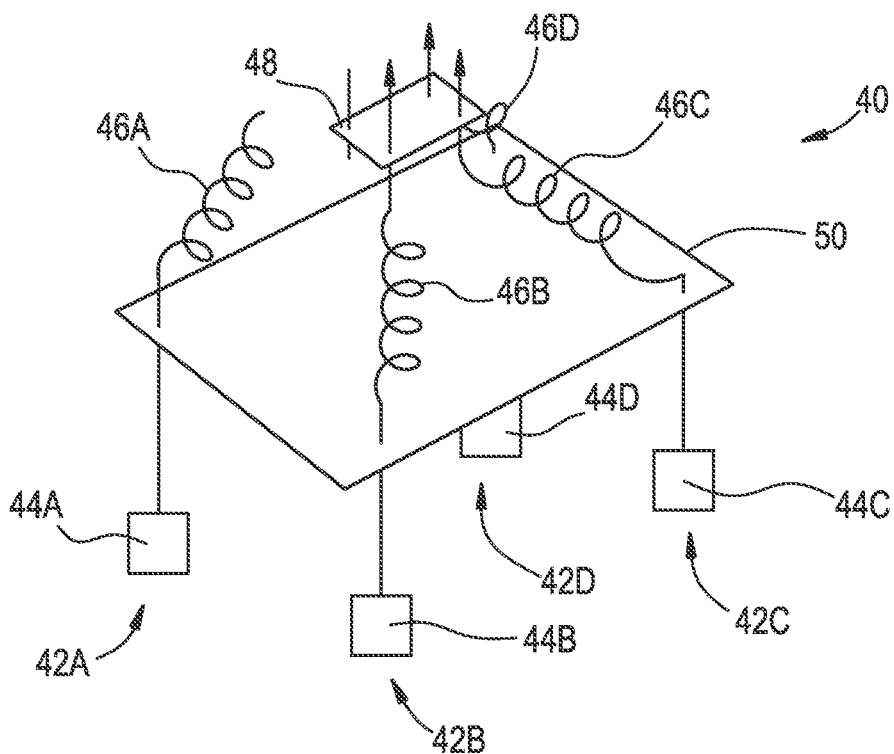
FIG. 4 is a perspective view of the Faraday's Law Contactor for a nuclear system shown in a tripped state.

FIGS. 3 and 4 provide a schematic view of a nuclear safety system 40 using Faraday's law. The nuclear safety system 40 utilizes four independent divisions 42A-42D for each division of the safety system. In a 4-division safety system utilizing a two out of four logic of like signals (A, B, C, D) from four separate sensors 44A-44D, there are six states including AB, AC, AD, BC, BD and CD to reach a tripped state.

As shown in FIG. 3, a plurality of helical coils 46A-46D are disposed with one of their ends adjacent to one another. In the example shown, four coils 46A-46d are arranged in a pyramid with each of the coils having a common pole end disposed at the peak of the pyramid. The coils 46A-46D can be made from metal using 3-D digital printing and can be anchored at their ends by upper and lower plates 48, 50. The relationship between the electric field curl and the magnetic field changing with time is used for safety system protection. In FIG. 3 each of the four coils 46A-46D are associated with each division 42A-42D of the safety system and receive a current from the four sensors 44A-44D associated with each division of the safety system. When the coils 46A-46D are produced by 3-D printing they can be linked physically but not electrically to the upper and lower plates 48, 50. With the input of a signal of a changing electrical field from the sensors 44A-44D a changing magnetic field will be produced. When there is a tripping signal (current flow) in two of the four coils 46A-46D, this causes a repelling force of common poles resulting in the failure or breakage of the device (for example coil 46A) as shown in FIG. 4, to provide the necessary interruption resulting in a safe shutdown signal of the safety circuit.

Thus, an electrical current passes through each of the coils 46A-46D for four separate divisions. The engineered direction of current flow in the coils 46A-46D results in either the north or the south poles all being on the same side. The opposing induced magnetic fields result in the magnetic breaking of one or both of the coils that breaks the current flow providing the safety signal.

Figure 5:
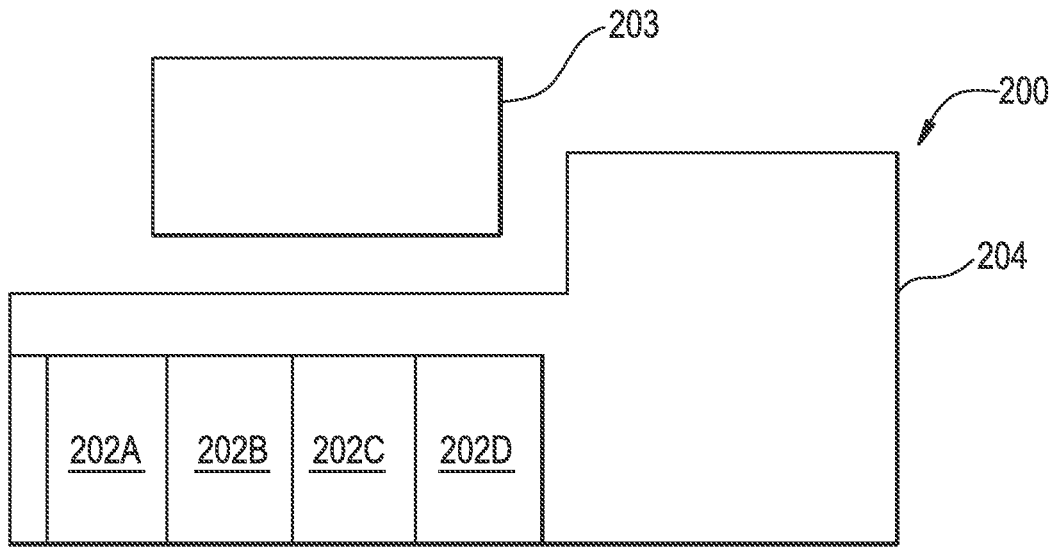
FIG. 5 is a schematic view of a conventional digital system of a distributed control and information system for a nuclear reactor.
Figure 6:
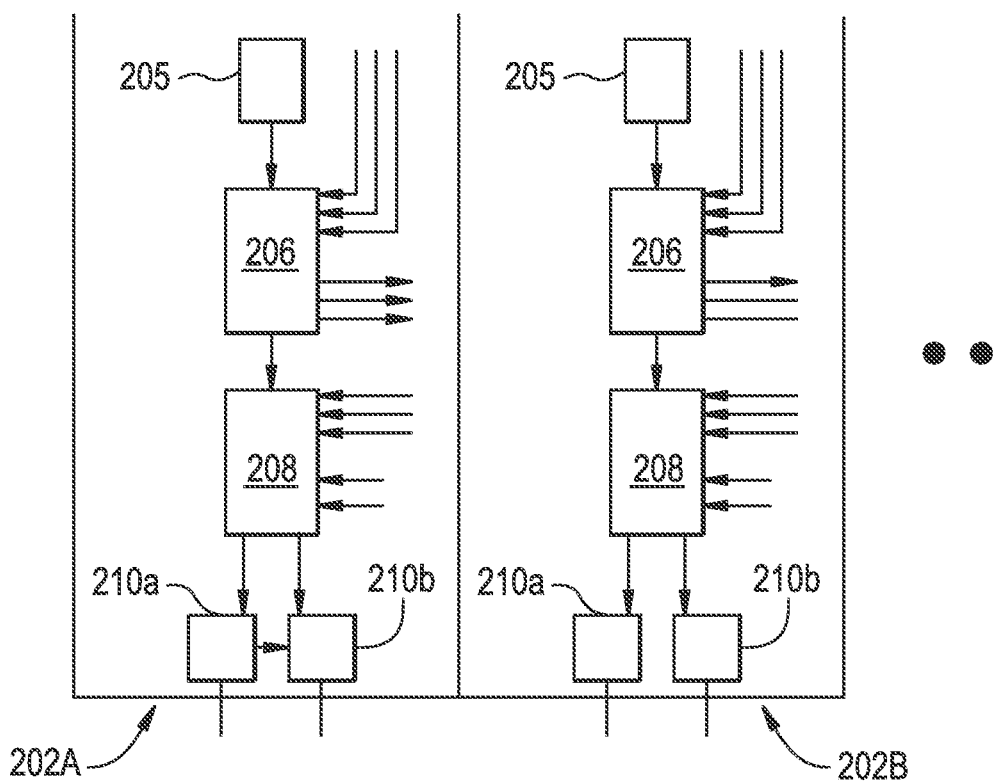
FIG. 6 is a schematic view of a safety portion of the conventional digital system of a distributed control and information system as shown in FIG. 5.

The four coils 46A-46D replace the DTM, TLU and OLU previously described in FIGS. 5 and 6.

During steady-state operation, of the devices, the sensors 44A-44D provide a low current (4 to 20 mA). If the current exceeds the device baseline due to a sensed temperature, pressure, flow or other parameter exceeding a predetermined level, the safety system response is actuated. For the Faraday's law device the response is a once-in-a-lifetime component (a fuse) once a coil is broken.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electro-technical device, comprising:
   a first coil connected to a first sensor for receiving a current therefrom representative a sensed condition, the first coil being physically restrained at first and second ends;
   a second coil connected to a second sensor for receiving a current therefrom representative of a sensed condition, the second coil being physically restrained at first and second ends and having the first end adjacent to the first end of the first coil;
   wherein when the first and second coils receive an increased current from the first and second sensors, the first and second coils each create a magnetic flux that repel one another in order to cause at least one of the coils to break.

2. The electro-technical device according to claim 1, wherein the first coil is connected to the first sensor at the second end and is connected to a first output line at the first end.

3. The electro-technical device according to claim 2, wherein the second coil is connected to the second sensor at the second end and is connected to a second output line at the first end.

4. The electro-technical device according to claim 1, wherein the first and second coils are physically restrained at the first and second ends by first and second plates, respectively.

5. The electro-technical device according to claim 1, wherein the first, second, third and fourth coils are physically restrained at the first and second ends by first and second plates, respectively.

6. An electro-technical device, comprising:
   a first coil connected to a first sensor for receiving a current therefrom representative a sensed condition, the first coil being physically restrained at first and second ends;
   a second coil connected to a second sensor for receiving a current therefrom representative of a sensed condition, the second coil being physically restrained at first and second ends and being adjacent to the first coil;
   a third coil connected to a third sensor for receiving a current therefrom representative of a sensed condition, the third coil being physically restrained at first and second ends and being adjacent to the first and second coils;
   a fourth coil connected to a fourth sensor for receiving a current therefrom representative of a sensed condition, the fourth coil being physically restrained at first and second ends and being adjacent to the first, second and third coils;
   wherein when at least two of the first, second, third and fourth coils receive an increased current from at two of the first, second, third and fourth sensors, the at least two of the first, second, third and fourth coils each create a magnetic flux that repel one another in order to cause at least one of the coils to break.

7. The electro-technical device according to claim 6, wherein the first coil is connected to the first sensor at the second end and is connected to a first output line at the first end.

8. The electro-technical device according to claim 7, wherein the second coil is connected to the second sensor at the second end and is connected to a second output line at the first end.

9. The electro-technical device according to claim 8, wherein the third coil is connected to the third sensor at the second end and is connected to a third output line at the first end.

10. The electro-technical device according to claim 9, wherein the fourth coil is connected to the fourth sensor at the second end and is connected to a fourth output line at the first end.

11. A method of making an electro-technical device, comprising:
    3-D printing a first coil physically restrained at first and second ends;
    connecting a first sensor to the first coil for receiving a current therefrom representative a sensed condition;
    3-D printing a second coil physically restrained at first and second ends and being adjacent to the first coil;
    connecting a second sensor to the second coil for receiving a current therefrom representative of a sensed condition;
    wherein when the first and second coils receive an increased current from the first and second sensors, the first and second coils each create a magnetic flux that repel one another in order to cause at least one of the coils to break.

12. The method according to claim 11 further comprising:
    3-D printing a third coil physically restrained at first and second ends and being adjacent to the first and second coils;
    connecting a third sensor to the third coil for receiving a current therefrom representative a sensed condition;
    3-D printing a fourth coil physically restrained at first and second ends and being adjacent to the first, second and third coil;
    connecting a fourth sensor to the fourth coil for receiving a current therefrom representative of a sensed condition.

13. The method according to claim 12, further comprising storing data from a 3-D printing machine regarding the 3-D printing of the first, second, third and fourth coils.

* * * * *